US00RE44549E

(19) United States
(12) Reissued Patent
Seong

(10) Patent Number: US RE44,549 E
(45) Date of Reissued Patent: Oct. 22, 2013

(54) METHOD AND SYSTEM FOR DISPLAYING TRAVELING-POSITION OF MOVE OBJECT

(75) Inventor: Deuk Yeong Seong, Gyeonggi-do (KR)

(73) Assignee: Thinkware Systems Corporation, Seoul (KR)

(21) Appl. No.: 13/603,057

(22) Filed: Sep. 4, 2012

Related U.S. Patent Documents

Reissue of:
(64) Patent No.: 7,982,635
Issued: Jul. 19, 2011
Appl. No.: 12/298,433
PCT Filed: Jan. 26, 2007
PCT No.: PCT/KR2007/000467
§ 371 (c)(1),
(2), (4) Date: Oct. 24, 2008
PCT Pub. No.: WO2007/126200
PCT Pub. Date: Nov. 8, 2007

(30) Foreign Application Priority Data

Apr. 27, 2006 (KR) ..... 10-2006-0038216

(51) Int. Cl.
*G08G 1/123* (2006.01)

(52) U.S. Cl.
USPC ..... 340/995.1; 340/995.17; 340/995.18; 340/902; 340/990; 340/426.19; 340/435; 340/439; 340/995.14; 348/113; 348/239; 701/454

(58) Field of Classification Search
USPC ..... 340/995.14, 995.17, 995.18, 902, 990, 340/426.19, 435, 439, 995.1; 701/207, 208, 701/211, 213, 214, 454; 348/113, 239
See application file for complete search history.

(56) References Cited

U.S. PATENT DOCUMENTS

| | | | | |
|---|---|---|---|---|
| 5,262,775 | A * | 11/1993 | Tamai et al. | 340/995.21 |
| 5,944,768 | A * | 8/1999 | Ito et al. | 701/418 |
| 6,038,510 | A | 3/2000 | Lee | |
| 6,374,181 | B1 * | 4/2002 | Matsuo | 701/431 |
| 2004/0204845 | A1 | 10/2004 | Wong | |
| 2004/0249566 | A1 | 12/2004 | Jeon | |
| 2005/0278113 | A1 | 12/2005 | Maruyama et al. | |

FOREIGN PATENT DOCUMENTS

| | | | |
|---|---|---|---|
| CN | 1173633 | A | 2/1998 |
| CN | 1173633 | | 5/1998 |
| JP | 10227646 | | 8/1998 |
| JP | 10227646 | A | 8/1998 |
| KR | 1020040074782 | | 8/2004 |
| WO | 03107312 | A2 | 12/2003 |
| WO | WO-03/107312 | | 12/2003 |
| WO | 2004074782 | A | 8/2004 |
| WO | WO 2004/074782 | | 9/2004 |

OTHER PUBLICATIONS

Patent Cooperation Treaty, "International Search Report and Written Opinion", ISA/KR, by Officer Gui Aee Woo in PCT Application No. PCT/KR07/000467; Document of 3 pages dated Apr. 24, 2007.

* cited by examiner

*Primary Examiner* — Tai T Nguyen
(74) *Attorney, Agent, or Firm* — Duane Morris LLP; Pablo Meles

(57) ABSTRACT

The present invention relates to a method and system for displaying a driving location of a moving object which controls a Red, Green, Blue (RGB) ratio by corresponding to a property of a road where the moving object travels, differently renders a moving object symbol according to the controlled RGB ratio, and thereby may identify a driving status of the moving object more accurately.

21 Claims, 7 Drawing Sheets i) < RENDERING METHOD IN CONVENTIONAL ART > ii) < RENDERING METHOD ACCORDING TO PRESENT INVENTION > iii) < RENDERING METHOD IN CONVENTIONAL ART > iv) < RENDERING METHOD ACCORDING TO PRESENT INVENTION > i)

ii)

METHOD AND SYSTEM FOR DISPLAYING TRAVELING-POSITION OF MOVE OBJECT

Matter enclosed in heavy brackets [ ] appears in the original patent but forms no part of this reissue specification; matter printed in italics indicates the additions made by reissue.

TECHNICAL FIELD

The present invention relates to a method and system for displaying a driving location of a moving object which control a Red, Green, Blue (RGB) ratio by corresponding to a property of a road where the moving object is driven, differently render a moving object symbol according to the controlled RGB ratio, and thereby may identify a driving status of the moving object more accurately.

BACKGROUND ART

Generally, navigation devices providing navigation services receive Global Positioning System (GPS) signals from satellites and compute current locations of users by using the received GPS signals.

Such navigation devices may ascertain current locations of vehicles. Accordingly, when vehicles arrive at points where navigation services are required, navigation services required at the points may be provided to users. For example, when a vehicle arrives at the point 100 meters away from a tunnel, navigation services such as 'a tunnel 100 meters ahead' may be provided.

However, navigation devices in a conventional art are susceptible to map-mismatching due to general errors in a GPS. As an example, after a vehicle actually enters a tunnel, incorrect information may be provided showing that the vehicle is driven on a general roadway.

When vehicles are driven on roads different from general roadways, e.g. tunnels, underground roadways, overpasses, and the like, and information that the vehicles are driven on the roads different from general roadways may be provided, users may quickly notice map-mismatching and navigation devices may be controlled to perform appropriate correction processes.

Accordingly, when providing navigation services, brightness or saturation of image symbols, which represent vehicles, varies according to road properties, and thus users may easily identify whether moving objects are driven on overpasses, tunnels, underground roadways, general roadways, and the like. A method and system for displaying a driving location for safe driving is required.

DISCLOSURE OF INVENTION

Technical Goals

The present invention provides a method and system for displaying a driving location of a moving object which differently display information associated with a color of the moving object according to a road type where the moving object is driven, and thereby enable a user to easily notice a map-mismatching error of a map provided via a navigation service.

The present invention also provides a method and system for displaying a driving location of a moving object which determine a brightness value or a saturation value of a moving object symbol to be rendered according to a control of a Red, Green, Blue (RGB) ratio corresponding to a type of road where the moving object is driven, and thereby may enable a user to easily compare a road type which is displayed via a navigation service and the road type where a vehicle is actually driven.

Technical Solutions

According to an aspect of the present invention, there is provided a method of displaying a driving location of a moving object, the method including: extracting road map data associated with the driving location of the moving object; determining color information of a moving object symbol by corresponding to section property information of the extracted road map data; and displaying road map data where the moving object symbol is rendered according to the determined color information via a predetermined display unit.

According to another aspect of the present invention, there is provided a system for displaying a driving location of a moving object, the system including: a road extraction unit extracting road map data associated with the driving location of the moving object; a symbol color determination unit determining color information of a moving object symbol by corresponding to section property information of the extracted road map data; a rendering unit rendering the moving object symbol to the road map data according to the determined color information; and a display unit displaying road map data where the moving object symbol is rendered.

BEST MODE FOR CARRYING OUT THE INVENTION

Figure 1:
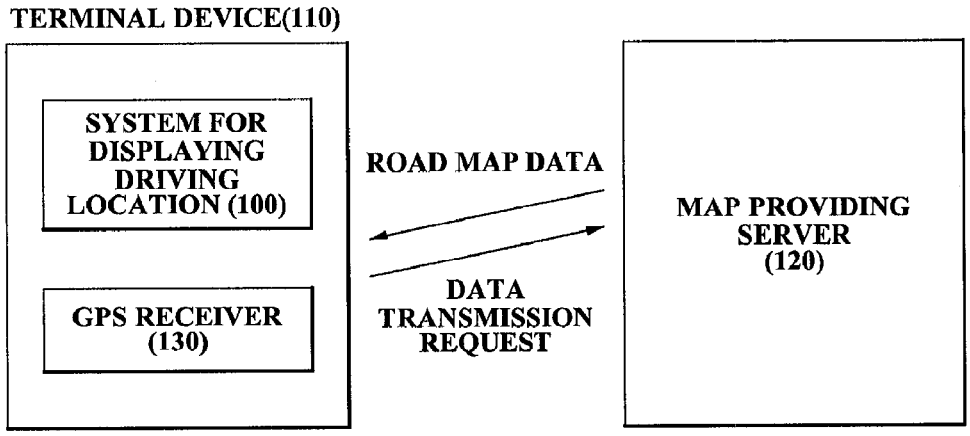
FIG. 1 is a basic diagram illustrating an operation of a system for displaying a driving location according to the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A 'moving object symbol' in the present specification may refer to an icon, which represents a moving object on a guided road, in a navigation service providing navigation information from a starting location to a destination. For example, a symbol, a figure, a vehicle model, and the like, as the moving object symbol may be two-dimensionally or three-dimensionally rendered on the guided road. Through this, a user provided with the navigation service may accurately identify where the moving object is located on the road.

Particularly, according to the present invention, a brightness value or a saturation value of the moving object symbol to be rendered is determined according to a control of a Red, Green, Blue (RGB) ratio corresponding to a road type where a vehicle, i.e. the moving object, is driven. Accordingly, the user may easily compare the road type where the vehicle is actually driven with a road type which is displayed via the navigation service. Thus, according to the present invention, when a map-mismatching occurs due to an error of a Global Positioning System (GPS), the user may notice the map-mismatching more rapidly, and an appropriate correction process may be performed.

As an example, when the vehicle passes a tunnel, the moving object symbol is rendered on road map data in a lower brightness value or a lower saturation value than when the vehicle is driven on a general roadway. Accordingly, the user may easily identify whether the road displayed via the navigation service is the tunnel.

As another example, when the vehicle is driven on an overpass, the moving object symbol is rendered in road map data as a higher brightness value or a higher saturation value than when driven on a general roadway. Accordingly, the user may easily identify whether the road displayed via the navigation service is the overpass.

FIG. 1 is a basic diagram illustrating an operation of a system for displaying a driving location according to the present invention.

The system for displaying a driving location 100 according to an embodiment of the present invention renders a moving object symbol in road map data. The road map data is successively extracted according to a movement of a moving object. Also, the system for displaying a driving location 100 visualizes road map data where the moving object symbol is rendered and provides a user with the visualized road map data. The system for displaying a driving location 100 may be embodied by being mounted in a terminal device 110 which provides a navigation service.

The terminal device 110 may receive road map data associated with a particular area from a map providing server 120. Also, the terminal device 110 may store the received road map data in a predetermined storage unit, i.e. a road information database included in the system for displaying a driving location 100. The storage unit may be a hard disk, a memory, and the like, storing entire road map data associated with the area. A size or a number of road map data, received at one time from the map providing server 120, is affected by a storage capability of the storage unit. The terminal device 110 may be mounted in the moving object such as a vehicle.

The map providing server 120 maintains road map data of entire areas, and transmits road map data associated with a corresponding area in response to a data transmission request from the terminal device 110 located in the particular area.

A GPS receiver 130 may be mounted in the terminal device 110, and compute a location coordinate value of the area where the terminal device 110 is located. Also, the GPS receiver 130 may request the map providing server 120 for a transmission of the road map data associated with the area corresponding to the computed location coordinate value. Specifically, the GPS receiver 130 may be involved in a generation of the data transmission request associated with the transmission of the road map data from the map providing server 120.

Also, the GPS receiver 130 successively computes a current location coordinate value of the moving object on a road guided according to a predetermined process. Accordingly, the GPS receiver 130 may prepare an environment which enables particular road map data to be successively extracted from the storage unit according to the movement of the moving object.

The system for displaying a driving location 100 renders a moving object symbol where an RGB ratio is controlled by corresponding to a road type where the moving object is driven. Accordingly, the user may rapidly and easily notice a map-mismatching of the road map data due to an error of a GPS.

Hereinafter, a detailed configuration of a system for displaying a driving location 200 according to an embodiment of the present invention is described with reference to FIG. 2.

Figure 2:
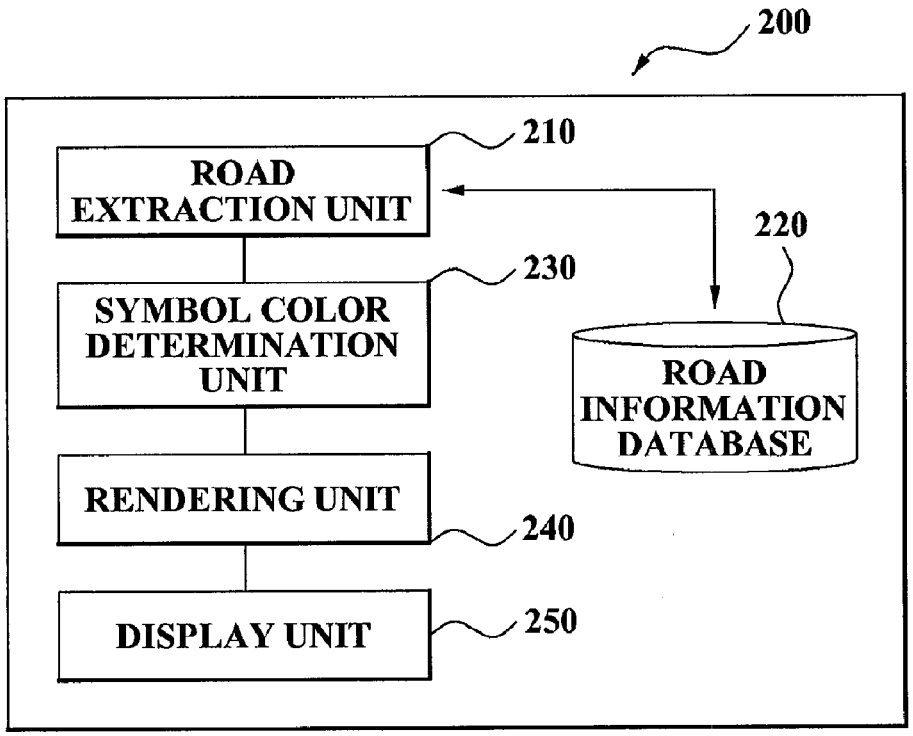
FIG. 2 is a diagram illustrating a configuration of a system for displaying a driving location according to an embodiment of the present invention.

FIG. 2 is a diagram illustrating a configuration of a system for displaying a driving location according to an embodiment of the present invention.

The system for displaying a driving location 200 according to an embodiment of the present invention includes a road extraction unit 210, a road information database 220, a symbol color determination unit 230, a rendering unit 240, and a display unit 250.

The road extraction unit 210 extracts road map data associated with a driving location of a moving object. Specifically, the road extraction unit 210 identifies and extracts the road map data corresponding to a current location coordinate value of the moving object from the road information database 220. The current location coordinate value is computed in a GPS receiver 130.

The road information database 220 storing the road map data is described in detail with reference to FIG. 3.

Figure 3:
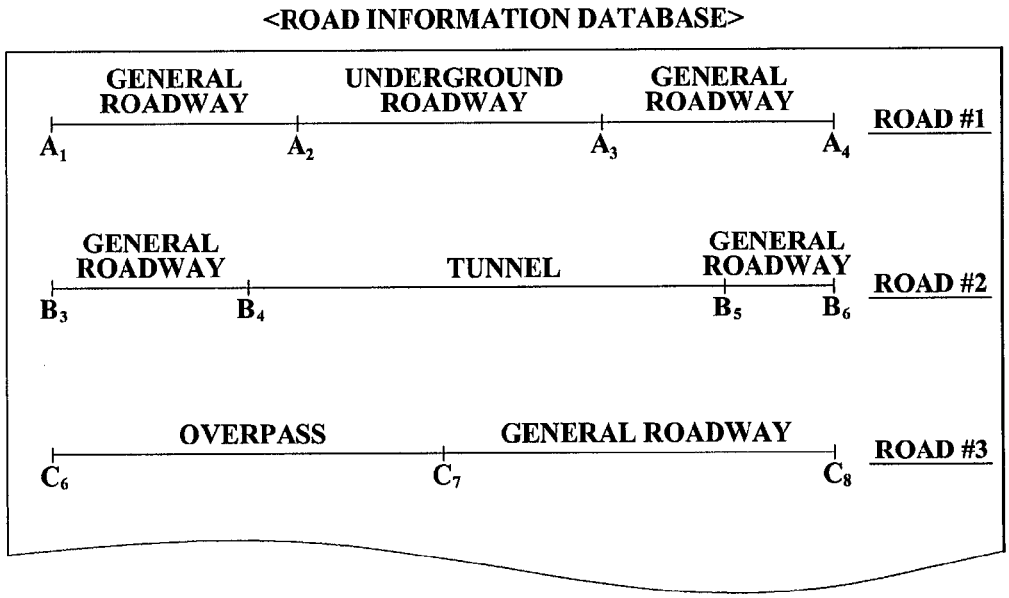
FIG. 3 is a diagram illustrating an example of road map data stored in a road information database according to the present invention.

FIG. 3 is a diagram illustrating an example of road map data stored in a road information database according to the present invention.

As described above, the road information database 220 stores and maintains road map data transmitted from a map providing server 120 in association with an area where a moving object is located. A point in time when the road map data is received from the map providing server 120 may be, for example, a time before and after a vehicle, i.e. the moving object, enters another overseen area. As an example, before the vehicle with the system for displaying a driving location 200 enters Seocho-gu, an administration area different from Gangnam-gu, in Seoul, the system for displaying a driving location 200 may receive entire road map data associated with the Seocho-gu from the map providing server 120. Also, the road information database 220 may store and maintain the received road map data of the Seocho-gu.

Particularly, the road map data stored in the road information database 220 may correspond to section property information according to a road type for each section. Accordingly, it is easily identified which road type is associated with particular road map data.

In FIG. 3, an example of the road information database 220 is illustrated. The road information database 220 stores road map data such as 'a road #1, a road #2, a road #3' with respect to a particular area, and stores section property information by corresponding to the section property information with respect to each section of the road map data.

The 'road #1', i.e. the road map data, stored in the road information database 220, corresponds to a 'general roadway', i.e. the section property information, with respect to a section from a point A1 to a point A2. Also, the 'road #1', i.e. the road map data, stored in the road information database 220, corresponds to an 'underground roadway', i.e. the section property information, with respect to a section from the point A2 to a point A3, and corresponds to an 'overpass', i.e. the section property information, with respect to a section from the point A3 to a point A4. Accordingly, for example, an environment providing a vehicle, which is driven in the section from the point A2 to the point A3 of the 'road #1', with information that a road type where the vehicle is driven is the underground roadway, may be prepared.

Also, the 'road #2', i.e. the road map data, stored in the road information database 220, corresponds to a 'general roadway', i.e. the section property information, with respect to a section from a point B3 to a point B4, corresponds to a 'tunnel', i.e. the section property information, with respect to a section from the point B4 to a point B5, and corresponds to a 'general roadway', i.e. the section property information, with respect to a section from the point B5 to a point B6. Accordingly, for example, an environment providing a vehicle, which is driven in the section from the point B4 to the point B5 of the 'road #2', with information, may be prepared. The provided information is that the road type where vehicle is driven is the tunnel.

Also, the 'road #3', i.e. the road map data, stored in the road information database 220, corresponds to an 'overpass', i.e. the section property information, with respect to a section from a point C6 to a point C7, and corresponds to a 'general roadway', i.e. the section property information, with respect to a section from the point C7 to a point C8. Accordingly, for example, an environment providing a vehicle, which is driven in the section from the point C7 to the point C8 of the 'road #3', with information, may be prepared. The provided information is that the road type where vehicle is driven is the overpass.

Under a condition that the road information database 220 storing the road map data is maintained, a road extraction unit 210 determines a current driving location of the moving object using GPS information generated by a GPS receiver 130. Also, the road extraction unit 210 extracts road map data associated with the determined driving location of the moving object from the road information database 220. In this instance, the GPS information includes a location coordinate value.

Also, the road extraction unit 210 may identify and extract the road map data for each section from the road information database 220 by corresponding to navigation information generated according to a predetermined process. The process may be a serial process generating the navigation information. For example, in the process, information about a starting location and a destination is received from a user, a route from the starting location to the destination is retrieved by a tracking logic operation, and navigation information associated with the retrieved route is generated.

Figure 4:
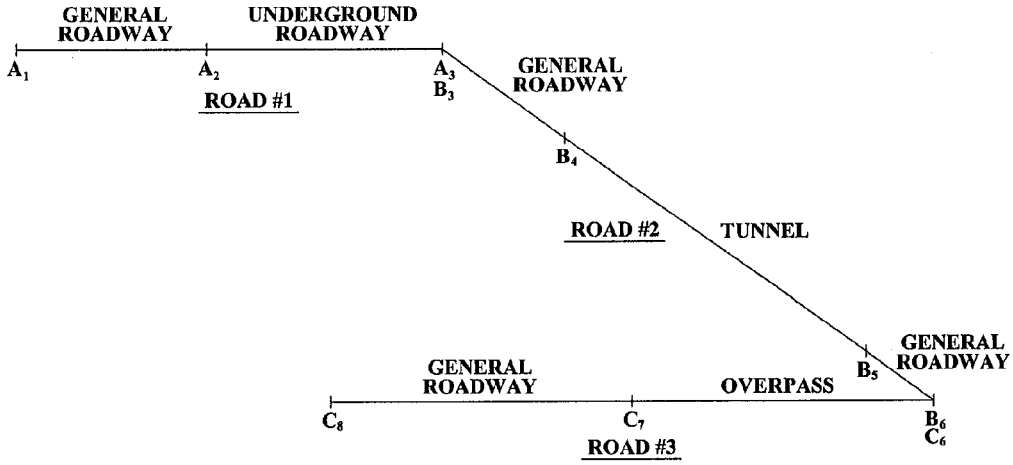
FIG. 4 is a diagram illustrating an example of extracting road map data for each section from a starting location to a destination based on navigation information according to the present invention.

FIG. 4 is a diagram illustrating an example of extracting road map data for each section from a starting location to a destination based on navigation information according to the present invention.

In FIG. 4, it is described that road map data with respect to each section is extracted by a road extraction unit 210 according to navigation information generated in association with a starting location A1 and a destination C8.

Specifically, the road extraction unit 210 may identify and extract road map data such as a 'road #1' of a section from the starting location A1 to a point A3, a 'road #2' of a section from a point B3 to a point B6, a 'road #3' of a section from a point C6 to the destination C8 from a road information database 220, according to navigation information associated with a retrieved route from the starting location A1 to the destination C8.

In FIG. 4, a point where the point A3 and the point B3 are joined is a point where the 'road #1' and the 'road #2', i.e. the road map data, are connected. Also, a point where the point B6 and the point C6 are joined is a point where the 'road #2' and the 'road #3', i.e. the road map data, are connected.

In this instance, the extracted road map data corresponds to section property information for each section. Accordingly, a road type where a moving object requires to be passed while driving from the starting location to the destination may be clearly identified.

For example, according to the extracted road map data illustrated in FIG. 4, while driving from the starting location A1 to the destination C8, the moving object successively passes a 'general roadway' and a 'underground roadway' of the 'road #1', a 'general roadway', a 'tunnel', and a 'general roadway' of the 'road #2', and an 'overpass' and a 'general roadway' of the 'road #3'.

Referring again to FIG. 2, a symbol color determination unit 230 determines color information of a moving object symbol by corresponding to the section property information of the extracted road map data. In this instance, the color information may refer to information determining a color, a brightness, a saturation, and the like, of the moving object symbol to be rendered in association with rendering the moving object symbol in the road map data.

Specifically, the symbol color determination unit 230 determines a value of the color, the brightness, the saturation, and the like of the moving object symbol to be rendered in the road map data for each section, and thereby may determine the color information. For example, in FIG. 4, the symbol color determination unit 230 determines color information where the moving object symbol is rendered in the 'road #1', i.e. the road map data, as a low brightness value or a low saturation value with respect to the section from the point A2 to the point A3, i.e. the 'underground roadway'.

The determining of the color information by the symbol color determination unit 230 may include controlling an RGB ratio with respect to the moving object symbol to be rendered in the road map data. Specifically, the symbol color determination unit 230 may determine the brightness value or the saturation value of the moving object symbol by controlling the RGB ratio by considering a visual image of the moving object, i.e. a vehicle, according to a road type.

As an example, with respect to the section from the point A2 to the point A3, i.e. the 'underground roadway', the symbol color determination unit 230 may determine the color information by controlling the RGB ratio with respect to the moving object symbol to have a lower brightness value or a lower saturation value than a predetermined reference value. In this instance, the moving object symbol is rendered in the 'road #1', i.e. the road map data. The reference value is a basic brightness value or a basic saturation value, which is determined by an operator of a system for displaying a driving location of a moving object according to the present invention. For example, the operator may set the reference value by considering an average brightness value or an average saturation value which is rendered when the moving object is driven on the 'general roadway' as the road type.

Also, with respect to the section from the point C2 to the point C7, i.e. the 'overpass', the symbol color determination unit 230 may determine the color information by controlling the RGB ratio with respect to the moving object symbol to have a higher brightness value or a higher saturation value than the predetermined reference value. In this instance, the moving object symbol is rendered in the 'road #3', i.e. the road map data.

A rendering unit 240 renders the moving object symbol in the road map data according to the determined color information. Specifically, when rendering the moving object symbol in the road map data, the rendering unit 240 processes the moving object symbol to be bright or dark depending on the road type identified by the section property information.

Also, the rendering unit 240 may render the moving object symbol by adding an effect image to the moving object symbol by considering the section property information. For example, when the section property information corresponds to the 'underground roadway' or the 'tunnel', the rendering unit 240 may render a vehicle model, i.e. the moving object symbol, as well as an effect image where headlights are turned on in the vehicle model.

A display unit 250 displays the road map data where the moving object symbol is rendered. Specifically, the display unit 250 visualizes the road map data where the moving object symbol is rendered using a different RGB ratio depending on the road type, and provides the road map data to a user.

Thus, according to the present invention, information associated with the color of the moving object symbol is differently displayed according to the road type, and thus the user may easily notice a map-mismatching error of a map displayed via a navigation service.

According to another embodiment of the present invention, the system for displaying a driving location of a moving object 200 performs the extracting of the road map data again, when a correction signal is generated by the user sensing the map-mismatching. Accordingly, more accurate navigation may be performed.

Specifically, when the correction signal is sensed, the system for displaying a driving location of a moving object 200 performs the extracting of the road map data again by the road extraction unit 210 in real time. Accordingly, a correct display with respect to a current location or a current road where the moving object is driven may be performed. For example, the correction signal may be generated via a map-matching correction button which is not illustrated and mounted in a terminal device 110 providing the navigation service. As an example, when the road map data displayed via the display unit 250 is different from a road where the moving object is actually driven, the user may push the map-matching correction button. In this instance, the correction signal is generated, and thus the road extraction unit 210 may newly extract road map data, associated with the road where the moving object is actually driven, from the road information database 220.

According to still another embodiment of the present invention, the system for displaying a driving location of a moving object 200 may receive time information about when the moving object is driven. Also, the system for displaying a driving location of a moving object 200 may control an RGB ratio with respect to a moving object symbol which is rendered in the road map data by corresponding to the received time information. Specifically, the system for displaying a driving location of a moving object 200 checks whether a time when the vehicle is driven corresponds to daytime or nighttime. Also, the system for displaying a driving location of a moving object 200 determines the brightness value or the saturation value by controlling an RGB ratio corresponding to the time, and renders the moving object symbol in the road map data according to the determined brightness value or the determined saturation value.

As an example, when the time corresponds to the daytime, the system for displaying a driving location of a moving object 200 may render the moving object symbol in the road map data as the average brightness value or the average saturation value, i.e. the predetermined reference value. Also, when the time corresponds to the nighttime, the system for displaying a driving location of a moving object 200 may render the moving object symbol in the road map data as a brightness value or a saturation value relatively lower than the average brightness value or the average saturation value.

Specifically, the system for displaying a driving location of a moving object 200 may differently perform the rendering of the moving object symbol by individual color information depending on the time.

Figure 5:
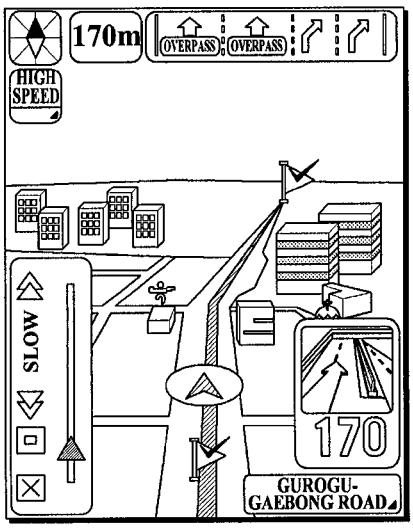
FIG. 5 is a diagram illustrating examples of displaying road map data where a moving object symbol is rendered in a conventional art and according to the present invention.
Figure 5:
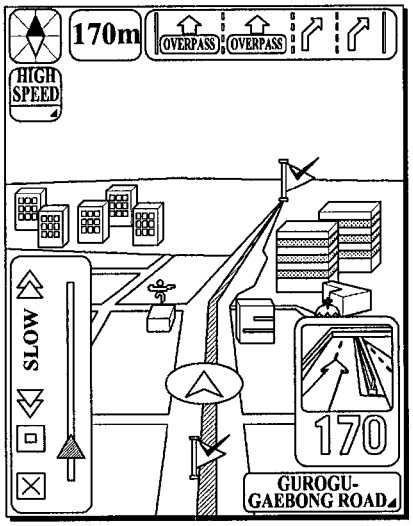
Figure 5:
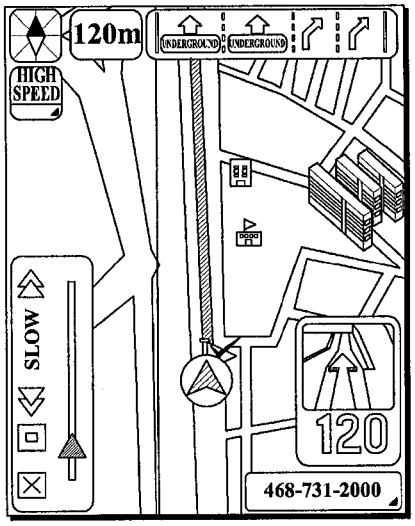
Figure 5:
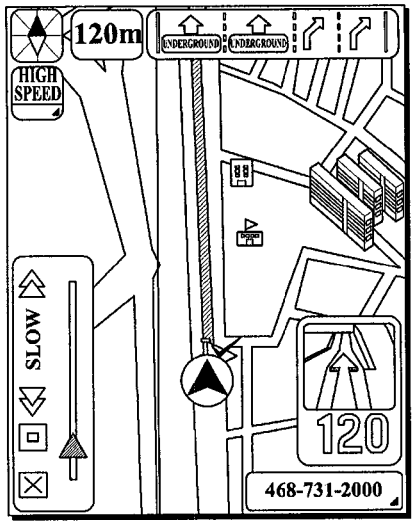

FIG. 5 is a diagram illustrating examples of displaying road map data where a moving object symbol is rendered in a conventional art and according to the present invention.

In part i) and part ii) of FIG. 5, methods of rendering the moving object symbol in the conventional art and according to the present invention are compared when a moving object, i.e. a vehicle, is driven on an 'overpass'.

The method of rendering the moving object symbol in the conventional art renders the moving object symbol in road map data as a same brightness value or a same saturation value in any road type regardless of a driving location. Specifically, as illustrated in part i) of FIG. 5, in the method of rendering the moving object symbol in the conventional art, the moving object symbol is rendered in the road map data as a same color information as when the moving object is driven on a 'general roadway', even though the moving object enters the 'overpass'.

Conversely, in part ii) of FIG. 5, when the moving object enters the 'overpass', the method of rendering the moving object symbol according to the present invention renders the moving object symbol in the road map data as a brightness value or a saturation value relatively higher than when the moving object is driven on the 'general roadway'. Specifically, the method of rendering the moving object symbol according to the present invention renders the moving object symbol more brightly than usual when the road type corresponds to the 'overpass'.

In part iii) and part iv) of FIG. 5, the methods of rendering the moving object symbol in the conventional art and according to the present invention are compared when the moving object is driven on a 'underground roadway'.

The method of rendering the moving object symbol in the conventional art renders the moving object symbol in the road map data as a same brightness value or a same saturation value in any road type regardless of the driving location. Specifically, as illustrated in part iii) of FIG. 5, in the method of rendering the moving object symbol in the conventional art, the moving object symbol is rendered in the road map data as the same color information as when the moving object is driven on the 'general roadway', even though the moving object enters the 'underground roadway'.

Conversely, in part iv) of FIG. 5, when the moving object enters the 'underground roadway', the method of rendering the moving object symbol according to the present invention renders the moving object symbol in the road map data as a brightness value or a saturation value relatively lower than when the moving object is driven on the 'general roadway'. Specifically, the method of rendering the moving object symbol according to the present invention renders the moving object symbol to be darker than usual when the road type corresponds to the 'underground roadway'.

Figure 6:
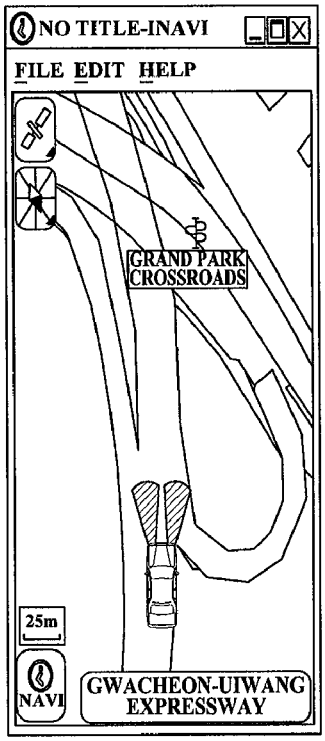
FIG. 6 is a diagram illustrating an example of adding an effect image to a moving object symbol and rendering the moving object symbol according to the present invention.
Figure 6:
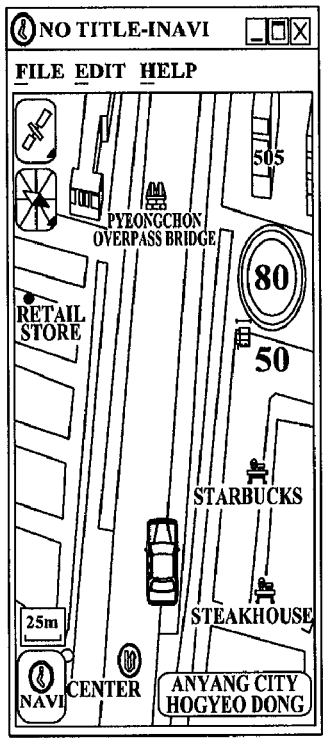

FIG. 6 is a diagram illustrating an example of adding an effect image to a moving object symbol and rendering the moving object symbol according to the present invention.

In part i) of FIG. 6, when a moving object enters a 'underground roadway' or a 'tunnel', adding an effect image to the moving object symbol and rendering the moving object symbol is illustrated. In this instance, the effect image corresponds to an image where headlights are turned on in the moving object symbol, i.e. a vehicle model.

Specifically, a system for displaying a driving location of a moving object 200 visualizes an image where the headlights are turned on when a vehicle passes the 'underground roadway' or the 'tunnel'. Also, the system for displaying a driving location of a moving object 200 renders the moving object symbol by adding the effect image where the headlights are turned on in the vehicle model to the moving object symbol. Accordingly, a user may easily notice that whether the moving object passes the 'underground roadway' or the 'tunnel' is accurately displayed via a navigation service.

In part ii) of FIG. 6, when the moving object enters an 'overpass', it is illustrated adding an effect image to the moving object symbol and rendering the moving object symbol. The effect image corresponds to an image where the moving object symbol, i.e. the vehicle model, is brightly displayed.

Specifically, the system for displaying a driving location of a moving object 200 visualizes an image where the vehicle is brightly seen due to sunlight. Also, the system for displaying a driving location of a moving object 200 renders the moving object symbol so that the vehicle model is brightly seen. Accordingly, the user may easily notice that whether the moving object is driven on the 'overpass' is accurately displayed via the navigation service.

Hereinafter, an operation of the system for displaying a driving location of a moving object 200 is described in detail.

Figure 7:
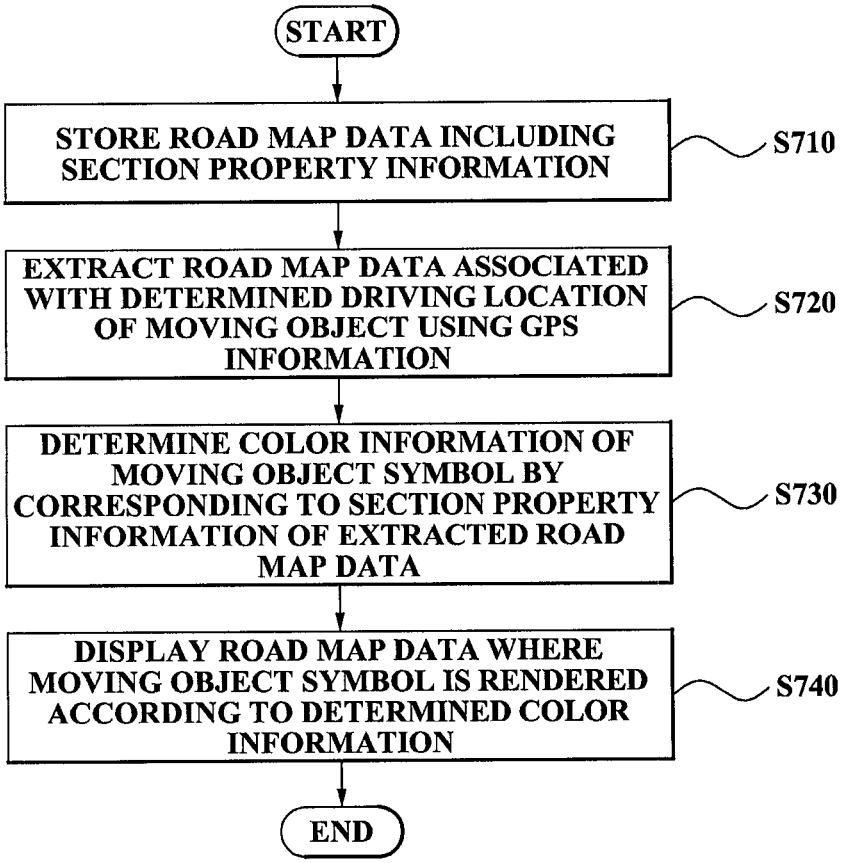
FIG. 7 is a flowchart illustrating a method of displaying a driving location of a moving object according to an embodiment of the present invention.

FIG. 7 is a flowchart illustrating a method of displaying a driving location of a moving object according to an embodiment of the present invention.

The method of displaying a driving location is performed by the system for displaying a driving location of a moving object 200.

In operation S710, the system for displaying a driving location of a moving object 200 maintains a road information database 220 storing road map data including section property information. Specifically, the maintaining in operation S710 signifies storing the road map data and the section property information. The section property information indicates a road type for each section in the road map data, which is described with reference to FIG. 3.

In operation S720, the system for displaying a driving location of a moving object 200 determines the driving location of the moving object using predetermined GPS information and extracts road map data corresponding to the determined driving location from the road information database 220. Specifically, the determining in operation S720 is to identify and extract road map data matched to a map by corresponding to a current location coordinate value from the road information database 220. The current location coordinate value is computed by a GPS receiver 130 in association with a current driving location of the moving object.

In operation S730, the system for displaying a driving location of a moving object 200 determines color information of a moving object symbol by corresponding to section property information of the extracted road map data. Specifically, the determining in operation S730 is to control an RGB ratio with respect to the moving object symbol rendered in the road map data.

Specifically, the system for displaying a driving location of a moving object 200 controls the RGB ratio so that a brightness value or a saturation value of the moving object symbol, rendered in the road map data, is changed depending on the road type, i.e. a road type where the moving object is driven.

As an example, when the section property information corresponds to an 'overpass', the system for displaying a driving location of a moving object 200 controls the RGB ratio so that a moving object symbol having a higher brightness value or a higher saturation value than a predetermined reference value is rendered. Specifically, when the moving object is driven on the 'overpass', the system for displaying a driving location of a moving object 200 processes the moving object symbol to be bright. An operator of the system for displaying a driving location of a moving object 200 may set the reference value by considering an average brightness value or an average saturation value when the moving object is driven on the 'general roadway' as the road type.

As another example, when the section property information corresponds to a 'underground roadway' or a 'tunnel', the system for displaying a driving location of a moving object 200 controls the RGB ratio so that the moving object symbol having a lower brightness value or a lower saturation value than the reference value is rendered. Specifically, when the moving object is driven on the 'underground roadway' or the 'tunnel', the system for displaying a driving location of a moving object 200 processes the moving object symbol to be dark.

In operation S740, the system for displaying a driving location of a moving object 200 displays road map data where the moving object symbol is rendered according to the determined color information via a display unit 250. Specifically, in operation S740, the system for displaying a driving location of a moving object 200 visualizes the moving object symbol and provides the user with the visualized moving object symbol. In this instance, the moving object symbol is rendered in the road map data as the brightness value or the saturation value which is different according to the road type.

Thus, according to the present invention, color-related information of the moving object is differently displayed according to the road type, and thus the user may easily notice a map-mismatching error.

Also, in operation S740, the system for displaying a driving location of a moving object 200 may receive time information about when the moving object is driven. Also, the system for displaying a driving location of a moving object 200 may control the RGB ratio with respect to the moving object symbol which is rendered in the road map data by corresponding to the received time information. Specifically, the system for displaying a driving location of a moving object 200 checks whether a time when a vehicle is driven corresponds to daytime or nighttime. Also, the system for displaying a driving location of a moving object 200 determines the brightness value or the saturation value by controlling an RGB ratio corresponding to the time, and renders the moving object symbol in the road map data according to the determined brightness value or the determined saturation value.

As an example, when the time corresponds to the daytime, the system for displaying a driving location of a moving object 200 may render the moving object symbol in the road map data as an average brightness value or an average saturation value. Also, when the time corresponds to the evening time, the system for displaying a driving location of a moving object 200 may render the moving object symbol in the road map data as a brightness value or a saturation value relatively lower than the average brightness value or the average saturation value.

According to another embodiment of the present invention, the system for displaying a driving location of a moving object 200 performs the extracting of the road map data again, when a correction signal is generated by the user sensing the map-mismatching. Specifically, when sensing the correction signal, the system for displaying a driving location of a moving object 200 performs the extracting of the road map data again by the road extraction unit 210 in real time. Accordingly, a correct display with respect to a current location or a current road where the moving object is driven may be performed.

Thus, according to the present invention, the user may rapidly and easily notice the map-mismatching of the road map data due to an error of a GPS. Also, more accurate map-matching in the road where the moving object is actually driven may be performed.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, a method and system for displaying a driving location of a moving object differently display information associated with a color of the moving object according to a road type where the moving object is driven, and thereby enable a user to easily notice a map-mismatching error of a map provided via a navigation service.

Also, according to the present invention, a method and system for displaying a driving location of a moving object determine a brightness value or a saturation value of a moving object symbol to be rendered according to a control of a Red, Green, Blue (RGB) ratio corresponding to a type of road where the moving object is driven, and thereby may enable a user to easily compare a road type which is displayed via a navigation service and the road type where a vehicle is actually driven.

The invention claimed is:

1. A method of displaying a driving location of a moving object, the method comprising:

extracting road map data associated with the driving location of the moving object;

determining color information of a moving object symbol by corresponding to section property information of the extracted road map data; and displaying road map data where the moving object symbol is rendered according to the determined color information via a predetermined display unit.

2. The method of claim 1, wherein the determining comprises controlling a Red, Green, Blue (RGB) ratio with respect to the moving object symbol which is rendered in the road map data.

3. The method of claim 2, wherein the controlling, when the section property information corresponds to an overpass, controls the RGB ratio to enable the moving object symbol to be rendered, the moving object symbol having a brightness value or a saturation value greater than a predetermined reference value.

4. The method of claim 3, wherein the controlling comprises setting the reference value by considering a brightness value or a saturation value when the section property information corresponds to a general roadway.

5. The method of claim 2, wherein the controlling, when the section property information corresponds to a underground roadway or a tunnel, controls the RGB ratio to enable the moving object symbol to be rendered, the moving object symbol having a brightness value or a saturation value less than a predetermined reference value.

6. The method of claim 5, wherein the controlling comprises setting the reference value by considering a brightness value or a saturation value when the section property information corresponds to a general roadway.

7. The method of claim 1, further comprising:

rendering a moving object symbol where headlights are turned on, when the section property information corresponds to an underground roadway or a tunnel.

8. The method of claim 1, further comprising:

receiving time information about when the moving object is driven, wherein the determining controls an RGB ratio with respect to the moving object symbol which is rendered in the road map data by corresponding to the received time information.

9. The method of claim 1, wherein the extracting comprises:

maintaining a road information database which stores road map data corresponding to the section property information;

determining a driving location of the moving object by using predetermined Global Positioning System (GPS) information; and extracting the road map data associated with the determined driving location from the road information database.

10. The method of claim 1, further comprising:

re-identifying the road map data associated with the driving location of the moving object, when a generation of a correction signal is sensed.

11. A *non-transitory* computer-readable recording medium storing a program comprising computer instructions for:

extracting road map data associated with the driving location of the moving object;

determining color information of a moving object symbol by corresponding to section property information of the extracted road map data; and displaying road map data where the moving object symbol is rendered according to the determined color information via a predetermined display unit.

12. A system for displaying a driving location of a moving object, the system comprising:

a road extraction unit extracting road map data associated with the driving location of the moving object;

a symbol color determination unit determining color information of a moving object symbol by corresponding to section property information of the extracted road map data;

a rendering unit rendering the moving object symbol to the road map data according to the determined color information; and a display unit displaying road map data where the moving object symbol is rendered.

13. The system of claim 12, wherein the symbol color determination unit controls an RGB ratio with respect to the moving object symbol which is rendered in the road map data.

14. The system of claim 13, wherein the symbol color determination unit controls the RGB ratio to enable the moving object symbol to be rendered when the section property information corresponds to an overpass, the moving object symbol having a brightness value or a saturation value greater than a predetermined reference value.

15. The system of claim 13, wherein the symbol color determination unit controls the RGB ratio to enable the moving object symbol to be rendered when the section property information corresponds to a underground roadway or a tunnel, the moving object symbol having a brightness value or a saturation value less than a predetermined reference value.

*16. A method of displaying a driving location of a moving object, the method comprising:*

*extracting road map data associated with the driving location of the moving object;*

*detecting whether a driving condition is changed, wherein the driving condition indicates at least one of a road type, driving time and a state of navigation service;*

*determining rendering information of a the moving object by corresponding to the driving condition when the driving condition is changed, wherein the rendering information is at least one of color information and an effect information; and*

*displaying road map data where the moving object is rendered according to the determined rendering information via a predetermined display unit.*

*17. The method of claim 16, wherein the determining step includes controlling a Red, Green, Blue (RGB) ratio with respect to the moving object which is rendered in the road map data.*

*18. The method of claim 17, wherein the controlling step includes settings reference value by considering a brightness value or a saturation value when the driving condition corresponds to a general roadway.*

*19. A system of displaying a driving location of a moving object, the system comprising:*

*a controller configured to:*

*extract road map data associated with the driving location of the moving object;*

*detect whether a driving condition is changed, wherein the driving condition indicates at least one of a road type, driving time and a state of navigation service;*

*determine rendering information of a the moving object by corresponding to the driving condition when the driving condition is changed, wherein the rendering information is at least one of color information and an effect information; and a display configured to:*

*display road map data where the moving object is rendered according to the determined rendering information via a predetermined display unit.*

*20. The system of claim 19, wherein the determining step includes controlling a Red, Green, Blue (RGB) ratio with respect to the moving object which is rendered in the road map data.*

*21. The system of claim 20, wherein the controlling step includes settings reference value by considering a brightness value or a saturation value when the driving condition corresponds to a general roadway.*

* * * * *